(12) United States Patent
Kermelk et al.

(10) Patent No.: US 8,757,732 B2
(45) Date of Patent: Jun. 24, 2014

(54) VEHICLE WHEEL

(75) Inventors: Werner Kermelk, Much (DE); Peter Reh, Windeck (DE)

(73) Assignee: Hayes Lemmerz Holding GmbH, Konigswinter (DE)

( * ) Notice: Subject to any disclaimer, the term of this patent is extended or adjusted under 35 U.S.C. 154(b) by 293 days.

(21) Appl. No.: 13/058,378

(22) PCT Filed: Aug. 10, 2009

(86) PCT No.: PCT/IB2009/053512
§ 371 (c)(1),
(2), (4) Date: Feb. 10, 2011

(87) PCT Pub. No.: WO2010/018531
PCT Pub. Date: Feb. 18, 2010

(65) Prior Publication Data
US 2011/0140506 A1 Jun. 16, 2011

(30) Foreign Application Priority Data

Aug. 11, 2008 (DE) ...................... 20 2008 010 617 U

(51) Int. Cl.
*B60B 3/04* (2006.01)
(52) U.S. Cl.
USPC ................................ 301/63.102; 301/63.106
(58) Field of Classification Search
USPC ............. 301/63.101, 63.102, 63.103, 63.104, 301/63.105, 63.106, 63.107
See application file for complete search history.

(56) References Cited

U.S. PATENT DOCUMENTS

| 1,856,095 | A | * | 5/1932 | Frank ............................... 301/6.2 |
| 4,363,347 | A | | 12/1982 | Baumgartner |
| 5,219,441 | A | * | 6/1993 | Utykanski et al. ........ 301/63.106 |

(Continued)

FOREIGN PATENT DOCUMENTS

| CH | 658224 A5 | 10/1986 |
| DE | 10306551 A1 | 10/2003 |

(Continued)

OTHER PUBLICATIONS

German Search Report to Application No. 202008010617.6.

(Continued)

*Primary Examiner* — Kip T Kotter
*Assistant Examiner* — Jean Charleston
(74) *Attorney, Agent, or Firm* — MacMillan, Sobanski & Todd, LLC

(57) ABSTRACT

The invention relates to a vehicle hybrid wheel comprising a formed steel rim ring and a wheel disk, manufactured as a light-alloy casting having a concentrically formed disk edge, on which the rim ring bears at least partially at multiple, spaced contact points for rotationally fixed connection to the wheel disk. In order to ensure an adequate force flux between the rim ring and the wheel disk, the wheel disk is provided with a circumferentially formed depression, in which a circumferential edge of the rim ring, angled radially outwards in relation to a bead seat section formed on the rim ring, engages by positive interlock and/or force closure.

25 Claims, 3 Drawing Sheets

(56) References Cited

U.S. PATENT DOCUMENTS

| | | | | |
|---|---|---|---|---|
| 5,421,642 | A | * | 6/1995 | Archibald ........................ 301/65 |
| 5,595,423 | A | * | 1/1997 | Heck et al. .................. 301/37.43 |
| 5,647,126 | A | | 7/1997 | Wei |
| 5,988,763 | A | | 11/1999 | Wei |
| 6,036,280 | A | | 3/2000 | Stanavich |
| 6,473,967 | B1 | * | 11/2002 | Coleman et al. .......... 29/894.322 |
| 6,502,308 | B1 | * | 1/2003 | Carfora et al. ............ 29/894.381 |
| 6,533,362 | B1 | | 3/2003 | Simmons |
| 6,869,149 | B2 | | 3/2005 | Tanaka |
| 8,042,879 | B2 | * | 10/2011 | Kermelk et al. .......... 301/63.106 |
| 2006/0284474 | A1 | * | 12/2006 | Bluemel .................. 301/63.101 |
| 2007/0222279 | A1 | * | 9/2007 | Csapo et al. ............. 301/64.101 |
| 2007/0278850 | A1 | * | 12/2007 | Rodrigues ................ 301/63.103 |
| 2010/0052413 | A1 | | 3/2010 | Kermelk et al. |

FOREIGN PATENT DOCUMENTS

| | | |
|---|---|---|
| DE | 102006055704 A1 | 5/2008 |
| EP | 0017619 A2 | 10/1980 |
| FR | 2588512 A2 | 4/1987 |
| JP | 60151102 A | 8/1985 |
| WO | 9721517 A1 | 6/1997 |
| WO | 0027654 A1 | 5/2000 |
| WO | 2008061703 A1 | 5/2008 |

OTHER PUBLICATIONS

Search Report to PCT/IB2009/053512 dated Nov. 18, 2009j.

* cited by examiner

VEHICLE WHEEL

CROSS-REFERENCE TO RELATED APPLICATIONS

This application is a national stage of International Application No. PCT/IB2009/053512 filed Aug. 10, 2009, the disclosures of which are incorporated herein by reference in entirety, and which claimed priority to German Patent Application No. 20 2008 010 617.6 filed Aug. 11, 2008, the disclosures of which are incorporated herein by reference in entirety.

BACKGROUND OF THE INVENTION

The invention relates to a vehicle wheel having a drop center, drop center flanks, safety bulges, an outer bead seat flank, an inner bead seat flank, an outer retaining flange and an inner retaining flange for supporting a tire, comprising a formed steel rim ring and a wheel disk, manufactured as a light-alloy casting and having bolt holes for connection to a heel hub, and a disk edge, which is formed concentrically around a wheel axis and on which the rim ring bears at least partially at multiple, spaced contact points for rotationally fixed connection to the wheel disk.

On vehicles, vehicle wheels serve to support the weight of the vehicle and to transmit force between the vehicle axles and the road by way of pneumatic tires. A corresponding pneumatic tire is supported with its outer tire bead against the outer bead seat flank and with its inner tire bead against the inner bead seat flank of the vehicle wheel, the retaining flange serving to prevent the tire beads migrating outwards from their firm seat on the bead seat flanks when a tire is under pressure. With a vehicle wheel in the fitted state on a vehicle, the outer disk face of the wheel disk and the outside of the outer retaining flange are visible, whilst the other sections of the vehicle wheel lie concealed and therefore form the inner vehicle-side wheel parts. In the case of cast, light-alloy wheels and also in that of welded, multipart steel wheels, so-called full-face vehicle wheels are known, in which the outer retaining flange, which in functional terms is generally also referred to as the rim flange, is integrated into the wheel disk. Because of their more extensive disk shape and their greater styling scope, full-face vehicle wheels are increasingly being used for off-road vehicles.

Due to the differences in material costs and material characteristics between steel and aluminum and owing to the increasing demands for the styling of vehicle wheels, efforts are being made in this market to produce vehicle wheels as vehicle hybrid wheels having a formed steel rim and a cast light-alloy wheel disk. The invention proceeds from a vehicle wheel of hybrid construction having a steel rim ring and a light-alloy wheel disk, as is described in WO2008/061703 A1 of the present applicant. In the vehicle hybrid wheel of generic type, the rim ring is fitted onto the wheel disk by upsetting and/or turning back the rim ring onto the disk edge, producing multiple spaced points of contact between the rim ring and the disk edge, which form pressure zones, intended to ensure an adequate force closure between the rim ring and the wheel disk, which in a vehicle hybrid vehicle wheel are composed of different materials, without the need to join them by means of a shrink-fitting operation, in which the rim ring is expanded by heating to in excess of 300° C. In the vehicle wheel of generic type an adequate anchorage is already achieved between the rim ring and the wheel disk, which can be produced with little effort.

BRIEF SUMMARY OF THE INVENTION

A feature of the invention is to create a vehicle hybrid wheel having a light-alloy wheel disk and a steel rim ring, in which the locking design can be produced with little effort and which ensures an adequate force closure between the rim ring and the wheel disk, whilst at the same time lending itself to use with virtually any wheel disk styling.

According to the invention this feature is achieved in that the wheel disk with its disk edge forms the outer retaining flange of the vehicle wheel and is provided on an inner side merging into the outer bead seat flank with a circumferentially formed depression, in which a circumferential edge of the rim ring, angled radially outwards in relation to the outer bead seat flank formed by the rim ring, engages by positive interlock and/or force closure. The vehicle hybrid wheel according to the invention therefore relies on the principle of a full face wheel disk, but the retaining forces acting between the rim ring and the wheel disk are not achieved by a welded connection but by at least one pressure zone for application of the retaining forces and separated at a distance therefrom by the positively interlocking and/or force-closed engagement of the edge of the rim ring in the depression on the inner side of the outer retaining flange of the wheel disk. Since the rim ring, in a departure from the generic state of the art, no longer grips with its edge around a rim flange section on the wheel disk edge, the edge of the thereby shortened rim ring instead terminating at the inner side of the wheel disk section forming the rim flange or the outer retaining flange, where it engages in a depression in the concealed area, the wheel disk may be endowed over its entire visible face with any form of styling capable of absorbing those forces that can occur in the vehicle for which the vehicle wheel is approved, and transmitting them between the wheel axle and the pneumatic tires.

In the especially preferred development the edge of the rim ring is anchored in the depression by turning back, pressure rolling and/or by upsetting and partial deformation of a bead seat section on a rim ring preform. It is particularly advantageous if the partial deformation of the rim ring is produced exclusively by turning back or by pressure rolling with a suitable tool and the edge of the rim ring and/or the bead seat section on the rim ring preform is in the process rolled out by a suitable dimension, generally of about 1 mm to 5 mm, in order to achieve the positively interlocking and force-closed anchorage of the edge in the depression.

The depression preferably has a circumferential lateral edge which faces the outer retaining flange of the wheel disk and which runs angled at an undercut angle to the wheel axis. The inclined orientation of the lateral edge in relation to the wheel axis means that in the fitted state the edge of the rim ring can grip behind the depression with its undercut and can ensure rear clamping against the inner side of the flange section of the wheel disk forming the outer rim flange of the vehicle wheel, thereby providing an additional security for the anchorage between the rim ring on the one hand and the wheel disk on the other, and even in the event of overstressing preventing any detachment of the rim ring and the wheel disk, which are anchored only by force closure and positive interlock. The undercut angle may vary according to the size and dimension of the vehicle wheel and may be from approximately 3° to 30°, preferably from approximately 5° to 25°, in particular from approximately 7° to 17°.

The disk edge suitably has a circumferential bulge, against which, an outer bulge section formed on the rim ring bears in the fitted state, in order to form a so-called hump or safety bulge for the pneumatic tire to be fitted to the vehicle wheel. The interaction between the bulge on the wheel disk and the bulge section on the rim ring may furthermore serve to apply a proportion of the necessary retaining forces, in order to achieve the rotationally fixed interlock between the wheel disk and the rim ring with high retaining forces. The disk edge furthermore preferably has a lateral flank support section, against which an outer drop center flank section, which is formed on the rim ring and which forms the outer drop center flank on the vehicle wheel, bears in a local pressure zone between the rim ring and the wheel disk, in order to build up or reinforce the retaining forces by virtue of this local pressure zone. In order to obtain a high pre-tensioning force, with which the drop center flank section bears against the disk-side flank support section in the local pressure zone, it is particularly advantageous if the drop center flank section is or will be deformed by axially guided rolling.

The disk edge may furthermore preferably have a bead seat stay section between the bulge and the depression, bearing on which is an outer bead seat flank section, which is formed on the rim ring and which forms the outer bead seat flank on the vehicle wheel. It is then particularly advantageous if the bead seat stay section is provided at the disk edge with one or more grooves, in which the rim ring engages with partially deformed sections of the bead seat section. The one groove might preferably be designed to run helically around the circumference of the bead seat stay section, or multiple grooves could be arranged, distributed over the circumference and oriented parallel to the axis, thereby producing an additional positive interlock between the rim ring and the wheel disk in a circumferential direction and hence a torsional safeguard. At the same time each groove running in a circumferential direction, in which the rim ring positively engages, produces an additional locking parallel to the axis. The anchorage between the rim ring and the wheel disk may be achieved, in particular, by turning back, by pressure rolling and/or by upsetting of a rim ring preform on the disk edge of the wheel disk. The turning back and in particular pressure rolling is advantageous in also producing the partial extension of the bead seat section and partial deformations thereof for positively interlocking engagement in the grooves and the pressure zones, since it is possible, within limits, to produce a flow (cold deformation) of the formed steel rim ring. In addition, an adhesive and/or a sealant could be introduced between the disk edge and the rim ring, in order to prevent the ingress of moisture and additionally to ensure anchorage through a cohesive material connection. The adhesives and/or sealants may preferably fill the joints or gaps, which are produced or remain between the disk edge and the rim ring during the production process. For this purpose it may be particularly advantageous to introduce sealants close to the point of contact or pressure zone between the flank support section and the drop center flank section, in order to seal the joint gap there adjoining the pressure zone. In the especially preferred development the rim ring may substantially be anchored only via the multiple force-closed contact points, in particular a point of contact formed by the undercut interlocking of the edge of the rim ring in the depression in the wheel disk, a second point of contact formed by the pressure zone on the bulge and a third pressure zone between the drop center flank section on the rim ring and the flank support section on the wheel disk. The contact zone between the bead seat section on the rim ring and the bead seat stay section on the wheel disk, particularly with grooves, into which the bead seat section is partially rolled or pressed, primarily assists only the rotationally fixed interlocking in a circumferential direction through positive interlock and serves only secondarily to develop retaining forces.

In order to further improve the grip between the wheel disk and the rim ring, in an alternative development of the vehicle wheel according to the invention the wheel disk may be provided on its disk inner side, at the transition to the disk edge, with an inner salient tapering the flank support section away, preferably to an annular, circumferential web. The inner salient permits a reduction in the rigidity of the disk edge in the area of the flank support section. At the same time the inner salient affords material savings on the wheel disk and a reduction in the weight of the vehicle wheel.

At the transition to the disk inner side the flank support section may project radially inwards over the drop center base of the rim ring, the contact zone or pressure zone of the rim ring and the flank support section then being situated at or close to the rim ring rounding between the drop center base and the outer drop center flank.

In another alternative development according to the invention the disk edge may have a flank support section, against which a drop center flank section, formed on the rim ring and forming the outer drop center flank, bears to form a local pressure zone between the rim ring and the wheel disk, the transition of the flank support section into the disk inner side being situated radially further outwards than the drop center base of the rim ring. In this development it is particularly advantageous if the drop center flank section can bear on the flank support section with a rectilinear section of the outer drop center flank on the flank support section, preferably close to or in the immediate area of the transition to the disk inner side. The reduction in the cross section of the wheel disk in the area of the disk edge in turn affords savings both in material and in weight. At the same time, shifting the contact zone into the rectilinear area produces an improvement, especially an increase in strength, since the rim ring is less stressed and/or has been less deformed in this area.

Other advantages of this invention will become apparent to those skilled in the art from the following detailed description of the preferred embodiments, when read in light of the accompanying drawings.

DETAILED DESCRIPTION OF THE INVENTION

Figure 1:
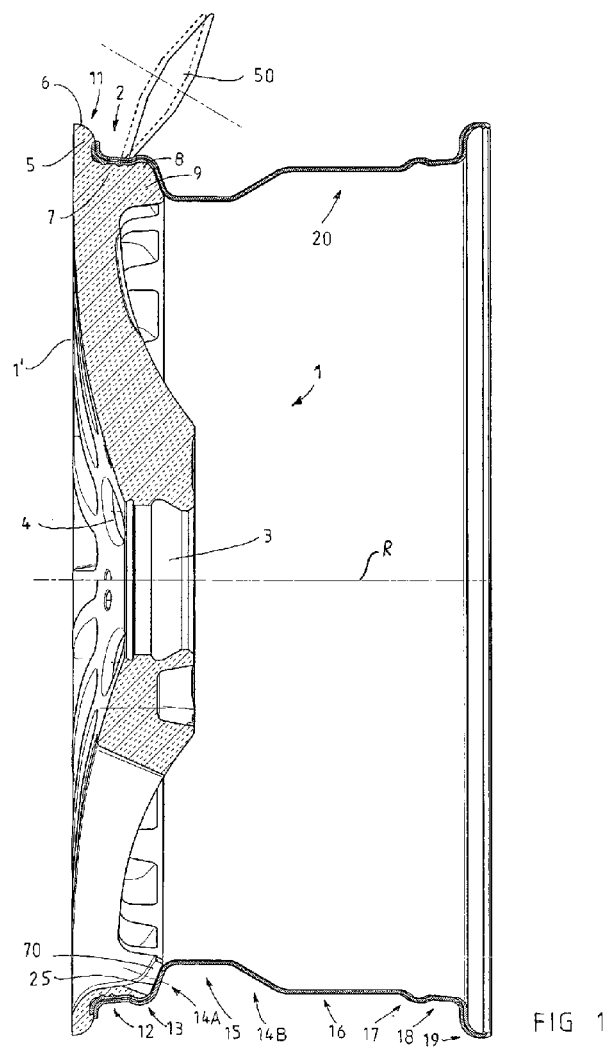
FIG. 1. shows a longitudinal section through the wheel disk and the rim ring of a vehicle wheel according to the invention.

In FIG. 1 the reference numeral 10 serves generally to denote a vehicle hybrid wheel according to the invention, which substantially comprises only a wheel disk 1 made from a lightweight metal, in particular aluminum, by a casting process, and a rim ring 20, which is produced by forming and punching from sheet steel strips, which for this purpose are produced rounded, welded into a ring and profiled by profile rolling. The rim ring 20 is anchored to a disk edge, generally denoted by the reference numeral 2, of the wheel disk 1, preferably exclusively by force closure and positive interlock, and the rim profile shape of the rim ring is formed running symmetrically around a wheel axis R of the vehicle wheel 10. As is known in the art for vehicle wheels, the vehicle wheel 10 formed by the wheel disk 1 and the rim ring 20 has an outer retaining flange 11, often also referred to as an outer rim flange, adjoining which is a bead seat flank 12, which generally in the case of an automobile wheel may run angled at approximately 5° and in the case of a commercial vehicle wheel with a so-called tapered rim may run angled at approximately 15° relative to the wheel axis R, the outer bead seat flank 12 and the rim flange 11 forming a secure and tight seat for the outer tire bead of a pneumatic tire (not shown) that may be fitted to the vehicle wheel 10. The outer bead seat flank 12 merges into a safety bulge 13, which is generally referred to as a hump, adjoining which is the outer drop center flank 14A of the rim drop center 15. As FIG. 1 clearly shows, the rim ring 20 receives support from the wheel disk 1 largely only the area of the outer bead seat 12, the safety bulge 13 and the outer drop center flank 14A, whilst the drop center 15 and adjoining this the inner drop center flank 14B, a transitional section 16 varying in length according to geometry of the vehicle wheel, an inner hump or safety bulge 17 and an inner bead seat flank 18 together with an inner rim flange or an inner retaining flange 19 remain unsupported by the wheel disk 1, and are carried exclusively by the rim ring 20 and formed by the latter. The inner bead seat flank 18 together with the inner retaining flange 19 in turn form a seat for the inner tire bead of the pneumatic tire (not shown) for the vehicle wheel.

The wheel disk 1 composed of a light-alloy casting has a central hole 3, by means of which it can be centered on a vehicle hub, and multiple bolt holes 4 are arranged symmetrically around the central hole 3, in order to connect the wheel disk 1 to the vehicle hub of a vehicle by means of wheel bolts (not shown). In the exemplary embodiment shown the wheel disk 1, on the visible outer face 1', has a styling with multiple radially running ribs, between which V-shaped ventilation holes are formed, the styling of the wheel disk 1 being only an example and it being possible, in principle, to select any other known or possible styling with other rib shapes, other rib geometry and other ventilation hole geometries.

In the case of the vehicle wheel 1 according to the invention, as in that of a full-face disk wheel, the disk edge 2 of the wheel disk 1 has the outer rim flange 11 of the vehicle wheel integrally formed, the associated flange section on the wheel disk 1 being denoted by the reference numeral 5 and merging with an initially curved inner side 6 into a section running approximately perpendicular to the wheel axis R. The contour of the disk edge 2 furthermore has a bead seat stay section 7, which is integrally formed on the wheel disk and which in the exemplary embodiment of an automobile wheel shown runs angled at approximately 5° to the wheel axle R, adjoining which are a bulge 8 and a flank support section 9, these parts serving, as will yet be explained, to provide support for the rim ring 20 on the wheel disk 1 and the rotationally fixed connection of the wheel disk 1 and the rim ring 20 composed of different materials.

Figure 2:
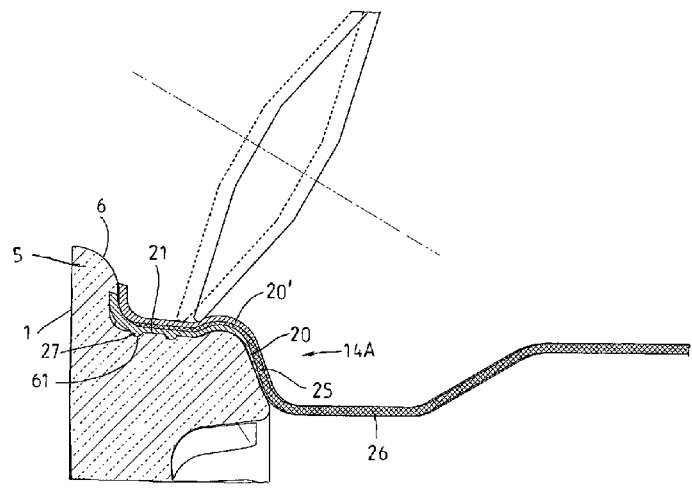
FIG. 2. shows a detailed view of the points of contact between the disk edge and the rim ring before and after producing the rotationally fixed interlock.
Figure 3:
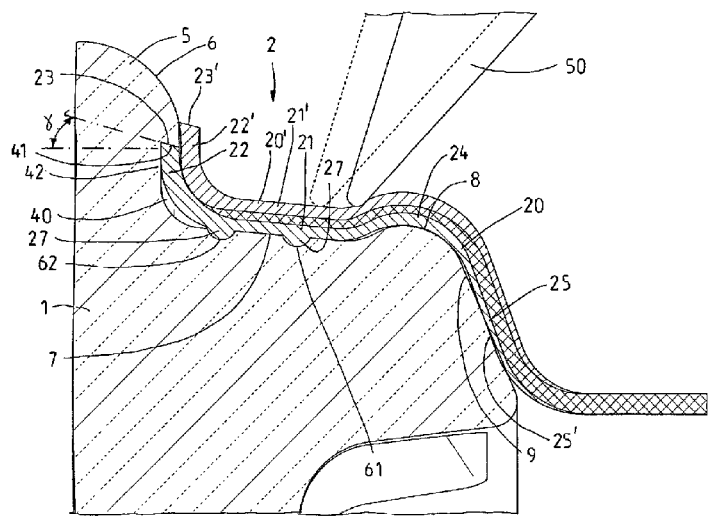
FIG. 3. shows a detailed view of the interlock in the area of the bulge, the bead seat and the rim flange before and after turning back a rim ring preform.

Reference will now be made to FIGS. 2 and 3, in which the disk edge 2, an as yet unanchored rim ring preform 20', an anchored rim ring 20 and a tool 50 such as a pressure roller, for example, are represented, for anchoring the rim ring preform 20' as a finished rim ring 20 to the disk edge 2 according to the invention, for example by pressure rolling. For anchoring purposes the inner side 6 of the flange section 5, integrally formed on the wheel disk 1 and forming the outer rim flange or the outer retaining flange 11, has a depression 40, in which the edge 22', already in the rim ring preform 20' angled radially upwards in relation to a bead seat section 21', is anchored through force closure and positive interlock by means of the tool 50. As can clearly be seen from FIG. 3 in particular, the rim ring preform 20', already profiled into a concentric ring, has no point of contact with the disk edge 2 of the wheel disk 1, either in the area of the inner side 6, nor at the bead seat section 7 against the bulge 8 nor on the flank support section 9. The edge 22' of the rim ring preform 20' stands a few millimeters above a lateral edge 41 of the depression 40 running concentrically around the wheel axis and defining the depression 40 on the inside 6. Only through the partial deformation of the rim ring preform 20' by means of the tool 50, in particular by pressure rolling, will the rim ring 20 be brought partially into contact with the disk edge 2. In the pressure rolling, material of the rim ring preform 20' can be partially stretched in order to press the edge 22 of the rim ring 20 into the depression 40. In order to produce, via the individual, local points of contact, an anchorage between the wheel disk 1 and the rim ring 20 which will generate adequate retaining forces capable of withstanding all the stresses occurring in the running operation of a vehicle wheel, without loosening the rotationally fixed anchorage between the wheel disk 1 and the rim ring 20, the bead seat section 21, in particular, is partially deformed in such a way that in the assembled state the edge 22 of the rim ring 20 bears on the base 42 of the depression and at the same time the end face 23 of the edge 22 bears against the lateral edge 41 of the depression 40. The lateral edge 41 runs at an angle to the wheel axis (R, FIG. 1) with an undercut angle γ, here of approximately 13°, so that the edge 22, correspondingly deformed in the extension process, or the associated end edge 23 with undercut is locked in the depression 40. The depth of the depression 40 is substantially equal to the starting thickness of the rim ring preform 20' in the area of the edge 22', so that in the assembled state no difference in level exists between the edge 22 of the rim ring 20 and the inside 6 of the flange section 5 on the disk edge 2 forming the retaining flange 11. The edge 22 of the rim ring 20 in its end area bears partially against the base 42 of the depression 40, but in the curved area at the transition to the bead seat section 21 then has a gap, so as to be able, through this clearance, to exert adequate retaining forces between the edge 22 and the depression 40 at the lateral edge 41.

The deforming process with the tool 50 causes the bead seat section 21 to bear at least locally against the bead seat stay section 7 of the disk edge 2, but without transmitting greater compressive forces in this area. The process of deforming the rim ring 20', already cylindrical in the initial state, also causes a bulge section 24 of the rim ring 20 to bear partially against the wheel disk-side bulge 8, so that in this area local compressive forces are built up, which generate an additional retaining force due to force closure and frictional grip. A further contact zone between the rim ring 20 and the disk edge 2 occurs at the flank support section 9 due to a direct contact of the underside 25' of the drop center flank section 25 against the flank support section 9. The flank support section 9 on the disk edge runs angled at approximately 80° to the wheel axis, whilst the outer drop center flank 14A and the drop center flank section 25 run approximately 1° to 4° more steeply. This point of contact exerting further retaining forces is situated at a distance from the point of contact between the bulge 8 and the bulge section 24 applying or exerting retaining forces. Again a clearance is also formed between the two aforesaid points of contact on the upper section of the flank support section 9, as can clearly be seen in particular from FIG. 3. As can clearly be seen from FIG. 2, the point of contact between the drop center flank section 25 on the rim ring 20, which in the finished vehicle wheel forms the drop center flank (14A) of the vehicle wheel, and the flank support section 9 is eccentrically offset downwards towards the drop center base 26 of the rim ring 20 in relation to the length of the drop center flank. FIG. 2 further clearly shows that the position of the drop center base 26 remains virtually unchanged by deformation of the rim ring preform 20' into the rim ring 20.

All retaining forces between the rim ring 20 and the wheel disk 1 can be applied solely via the points of contact between the end edge 23 of the edge 22 and the lateral edge 41 of the depression 40, between the bulge 8 and the bulge section 24 and between the flank support section 9 and the drop center flank section 25 on the rim ring 20. In the exemplary embodiment shown the pressure rolling process additionally causes the outer bead seat section 21 to bear against the bead seat stay section 7. In order to support the anchorage there in the circumferential direction, a depression 61 which, as shown in FIG. 1 may run helically around the circumference of the bead seat stay section 7 and may form multiple grooved depressions 61, 62, may be formed in the bead seat stay section 7 at the disk edge 2 of the wheel disk 1, into which groove the bead seat section 21 is then pressed at least partially or preferably completely, as shown, with salients 27, in order to additionally absorb, through positive interlock, the forces acting in a circumferential direction and to increase the torsional safeguard between the wheel disk 1 and the rim ring 20. The corresponding grooves 61, 62, here running helically around the bead seat flank section 7, could also be dispensed with, however, and the bead seat flank section could be provided with a deep indentation, into which the bead seat section might be pressed by turning back, pressure rolling or upsetting, but springs back due to the recovery forces in the steel material and bears only loosely, if at all, in the vehicle wheel.

In the finished vehicle wheel 1 the flange section 5 forms both the visible part of the outer retaining flange 11 and a major part of the inner face 6. The edge 22 pressed into the depression 40, together with the bead seat section 22, forms the outer bead seat flank 12 of the vehicle wheel 1 and both humps or safety bulges 13, 17 together with the other rim sections (14-19) are formed exclusively by parts of the rim ring 20.

A valve hole 70 (FIG. 1) for securing a valve passes, in the area of a ventilation hole, both though the wheel disk 1 to the flank support section 9 and through the rim ring 20 in the drop center flank section 25. The valve hole 70 may preferably comprise a through-hole, which is made at the end of the operation for assembling the rim ring 20 and the wheel disk 1. Alternatively the wheel disk 1 and the rim ring 20 may each be provided, prior to assembly, with a through-hole in the flank support section 9 and the outer drop center flank section 25 respectively, the holes being aligned for a precise fit in the assembly process and secured by an auxiliary fixture during assembly.

Figure 4:
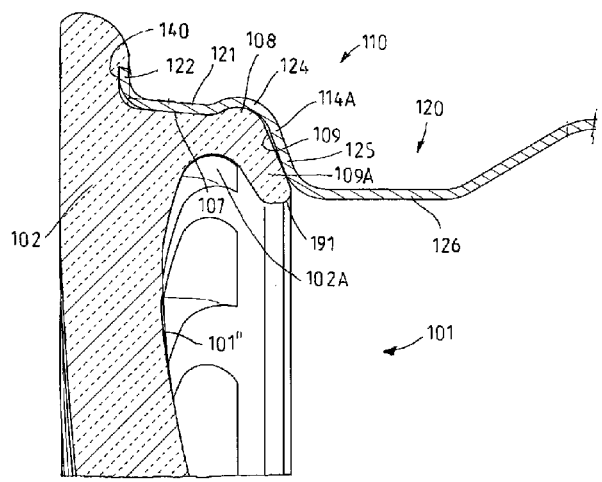
FIG. 4. shows a detailed view of the interlock between the wheel disk and the rim ring in a vehicle wheel according to a second embodiment according to the invention.

FIG. 4 in a detailed view like that in FIG. 3 shows a vehicle wheel 110 according to the invention in a second exemplary embodiment. Components performing identical functions are provided with reference numerals increased by 100 in comparison to the first exemplary embodiment. The rim ring 120 is attached to the disk edge 102 of the wheel disk 101 as in the preceding exemplary embodiment, in that an edge 122 of the bead seat section 121 here engages in a depression 140 on the disk edge 102 by positive interlock and force closure. As in the preceding exemplary embodiment, the rim ring 120 bears on a bead seat stay section 107 with the bead seat section 121 and on a bulge 108 with an outer bulge section 124. Another pressure zone is furthermore formed between the wheel inner side and the flank support section 109 pointing obliquely upwards and the outer drop center flank 114A, the local pressure zone again, as in the preceding exemplary embodiment, being situated close to the transitional rounding of the drop center flank 114A or the drop center flank section 125 of the rim ring 120 into the drop center base 126. A difference exists, however, in the configuration of the wheel disk 101 on the disk inner side 101", since this is provided with an inner salient 102A running radially around the disk inner side 101", which here tapers the flank support section 109 to a web 109A running annularly. Although the transition of the disk inner side 101" into the flank support section 109, which in FIG. 4 is provided with the reference numeral 191, is again situated radially further inwards than the drop center base 126 of the rim ring 120, in inner salient 102A nevertheless produces not only a material saving and a reduction in weight at the disk edge 102 but also at the same time reduces the rigidity of the rim stay section 109, so that the deformation behavior and contact pressure between the rim ring 120 and the wheel disk 102 are improved. In the exemplary embodiment shown the inner salient 102A takes the form of a curved flute, other configurations also being feasible in order to achieve an optimum between minimal weight and a reduction in rigidity.

Figure 5:
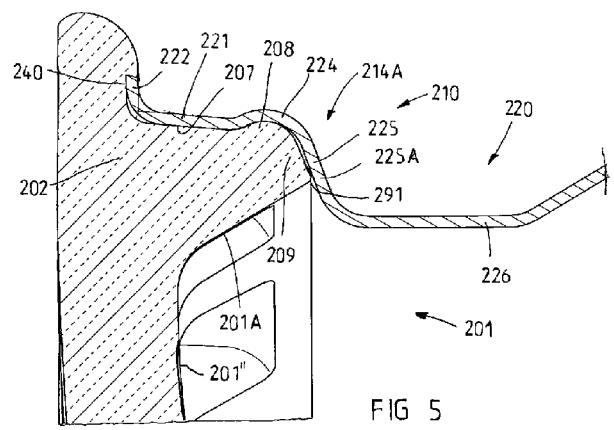
FIG. 5. shows a detailed view of the interlock between the wheel disk and the rim ring in a vehicle wheel according to a third embodiment according to the invention.

FIG. 5 shows a third exemplary embodiment of a vehicle wheel 210, in which the rim ring 220 again engages with an edge 222, bent over radially outwards, in a circumferential depression 240 formed on the disk edge 202. Here too, the bead seat section 221 bears on a bead seat stay section 227, it again being possible to form grooves for additional positively interlocking anchorage. A second contact zone is situated in the area between the bulge 208 and the outer bulge section 224 and a further contact zone is formed between flank support section 209 and the drop center flank section 225. However, this contact zone is situated closer to the bulge 208 than in the preceding exemplary embodiment and is not situated close to the drop center base rounding, but rather centrally in the rectilinear section 225A between the bulge section 224 and the drop center base rounding 226A. In order to produce a contact zone in the rectilinear section 225A, the design of the disk inner side 201" is again modified in the area of the disk edge 202 and here runs obliquely upwards with an edge section 201A of the wheel disk 201 in such a way that the transition 291 from the disk inner side 201" into the flank support section 209 is situated substantially more radially outwards than the drop center base 226. Although the flank support section 209 may have a similar or the same inclination as in the preceding exemplary embodiments, the modification of the disk inner side 201" and the transition 291 situated radially much further outwards affords a considerably shorter flank support section 209 and allows the rectilinear section 225A of the drop center flank section 225 forming the outer drop center flank 214A to bear against the flank support section 209.

To the person skilled in the art, the preceding description will suggest numerous modifications, which are intended to fall within the scope of the claims attached. Sealants and/or adhesives could be arranged between the rim ring and the disk edge and the grooves could be dispensed with. It would also be possible to have more than two circumferential grooves and to vary the position, attitude and alignment (e.g. parallel or transversely to the axis) and cross section of the grooves. In a commercial vehicle the angle of the bead seat section might be greater and could be approximately 15°, for example. The styling of the outer face of the wheel disk may extend right into the visible outer side of the retaining flange. The extent and number of the clearance spaces between the rim ring and disk edge may also vary. Finally the rim ring could also be heated even prior to turning back, in order to assist the deformation operation through a process of shrinkage.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle wheel having a drop center, drop center flanks, safety bulges, an outer bead seat flank, an inner bead seat flank, an outer retaining flange and an inner retaining flange for supporting a tire, consisting of a formed steel rim ring and a wheel disk, manufactured as a light-alloy casting having bolt holes for connection to a vehicle hub, and a disk edge, which is formed concentrically around a wheel axis and on which the rim ring bears at least partially at multiple, spaced contact points for rotationally fixed connection to the wheel disk, wherein the wheel disk with a section of the disk edge forms the outer retaining flange of the vehicle wheel and is provided on an inner side of the section merging into the outer bead seat flank with a circumferentially formed depression, in which a circumferential edge of the rim ring, angled radially outwards in relation to a bead seat section formed on the rim ring, engages by at least one of a positive interlock and a force closure, wherein the circumferential edge of the rim ring is integral with and non-distinct from the rim ring.

2. The vehicle wheel as claimed in claim 1, wherein the edge of the rim ring is anchored in the depression by at least one of a pressure rolling and an upsetting.

3. The vehicle wheel as claimed in claim 1, wherein the depression has a circumferential lateral edge which faces the section forming the outer retaining flange and which runs angled at an undercut angle to the wheel axis.

4. The vehicle wheel as claimed in claim 3, wherein the undercut angle is approximately 3° to 30°.

5. The vehicle wheel as claimed in claim 3, wherein the undercut angle is approximately 7° to 17°.

6. The vehicle wheel as claimed in claim 1, wherein the disk edge has a circumferential bulge, against which an outer bulge section formed on the rim ring bears.

7. The vehicle wheel as claimed in claim 6, wherein the disk edge has a flank support section, against which a drop center flank section, which is formed on the rim ring and which forms the outer drop center flank, bears forming a local pressure zone between the rim ring and the wheel disk.

8. The vehicle wheel as claimed in claim 7, wherein the drop center flank section is deformed by axially guided rolling.

9. The vehicle wheel as claimed in claim 1, wherein the disk edge has a bead seat stay section between the bulge and the depression, on which a bead seat section, which is formed on the rim ring and which forms the outer bead seat flank, bears.

10. The vehicle wheel as claimed in claim 9, wherein the bead seat stay section is provided with a groove, in which the rim ring engages with partially deformed sections of the bead seat section.

11. The vehicle wheel as claimed in claim 10, wherein the groove runs axially parallel.

12. The vehicle wheel as claimed in claim 9, wherein the rim ring is anchored to at least one of the bulge and the bead seat stay section by at least one of turning back, pressure rolling and upsetting of a rim ring preform.

13. The vehicle wheel as claimed in claim 9, wherein the bead seat stay section is provided with multiple grooves, in which the rim ring engages with partially deformed sections of the bead seat section.

14. The vehicle wheel as claimed in claim 13, wherein the groove runs axially parallel.

15. The vehicle wheel as claimed in claim 1, wherein at least one of an adhesive and a sealant is introduced between the disk edge and the rim ring.

16. The vehicle wheel as claimed in claim 1, wherein the rim ring is anchored to the wheel disk substantially only by multiple force-closed contact points.

17. The vehicle wheel as claimed in claim 16, wherein the multiple force-closed contact points include a first point of contact formed by the undercut interlocking between the edge of the rim ring in the depression, a second point of contact formed by the pressure zone on the bulge, and a third pressure zone between the drop center flank section and the flank support section.

18. The vehicle wheel as claimed in claim 1, wherein the rim ring is provided with a valve hole in a drop center flank section and the wheel disk is provided with a valve hole in a flank support section.

19. The vehicle wheel as claimed in claim 1, wherein the wheel disk is provided on a disk inner side thereof, at a transition to a disk edge, with an inner salient tapering a flank support section away, to an annular, circumferential web.

20. The vehicle wheel as claimed in claim 19, wherein the flank support section, at the transition to the disk inner side, projects radially inwards over a drop center base of the rim ring.

21. The vehicle wheel as claimed in claim 1, wherein the disk edge has a flank support section, against which a drop center flank section, formed on the rim ring and forming an outer drop center flank, bears to form a local pressure zone between the rim ring and the wheel disk, the transition of the flank support section into a disk inner side being situated radially further outwards than a drop center base of the rim ring.

22. The vehicle wheel as claimed in claim 21, wherein the drop center flank section bears on the flank support section with a rectilinear section on the flank support section.

23. The vehicle wheel as claimed in claim 22, wherein the rectilinear section bears on the flank support section close to the transition to the disk inner side.

24. The vehicle wheel as claimed in claim 22, wherein the rectilinear section bears on the flank support section in the immediate area of the transition to the disk inner side.

25. The vehicle wheel as claimed in claim 1, wherein the edge of the rim ring is anchored in the depression by partial deformation of a bead seat section on a rim ring preform.

* * * * *